United States Patent [19]
Spaak et al.

[11] 3,719,441
[45] March 6, 1973

[54] APPARATUS FOR MOLDING ARTICLES

[75] Inventors: Albert Spaak, Little Falls; Clifford L. Weir, Wayne, both of N.J.

[73] Assignee: Allied Chemical Corporation, Morristown, N.J.

[22] Filed: June 22, 1970

[21] Appl. No.: 59,816

Related U.S. Application Data

[60] Division of Ser. No. 811,271, Feb. 19, 1969, abandoned, Continuation-in-part of Ser. No. 679,387, Oct. 31, 1967, abandoned.

[52] U.S. Cl. .................. 425/4, 264/51, 425/244, 425/245
[51] Int. Cl. ............................. B29d 27/04
[58] Field of Search .......... 264/51, 52, 53, 54; 425/4, 425/244, 245

[56] References Cited

UNITED STATES PATENTS

| | | | |
|---|---|---|---|
| 3,268,635 | 8/1966 | Kraus et al. | 264/53 X |
| 2,831,214 | 4/1958 | Eyles et al. | 425/244 X |
| 3,566,449 | 3/1971 | Goins et al. | 425/4 |

*Primary Examiner*—H. A. Kilby, Jr.
*Attorney*—Patrick L. Henry

[57] ABSTRACT

This disclosure is directed to a method of for injection molding. Premature foaming and setting of foamable molding materials is prevented by accomplishing the injection of the molding material into a preheated mold cavity having a gaseous substance therein at a pressure in excess of that required to prevent foaming of the molding material. Planned wastage of molding material is minimized by providing pistons in the runners which carry the molding materials to the mold, which pistons force excess molding material away from the mold so as to recompress and recover the material, thereby to be used in the next subsequent molding cycle.

10 Claims, 4 Drawing Figures

3,719,441

APPARATUS FOR MOLDING ARTICLES

RELATED APPLICATIONS

This application is a division of Ser. No. 811,271 filed Feb. 19, 1969, now abandoned; and is a continuation-in-part of Ser. No. 679,382. filed Oct. 31, 1967, now abandoned.

This application is a continuation-in-part of our copending application Ser. No. 679,387 for METHOD AND APPARATUS FOR MOLDING ARTICLES which was filed on Oct. 31, 1967, and is now abandoned and the invention of which is assigned to the same assignee as the assignee of the invention of this application.

BACKGROUND OF THE INVENTION

Injection molding of expandable or foamable thermoplastic and thermosetting resinous materials has come into broad use as a manufacturing process for articles such as toys, furniture legs, lamp bases, wheels, soda cases, bowling pins, shoe heels and other relatively inexpensive items. The advantage of using injection molding for the manufacture of these articles is that the articles are produced with a hard, high density, solid shell about a lower density, cellular, foam core so as to provide a product having relatively high strength while being of relatively low weight.

The injection method which has been used in producing the high density shell about the lower density, foam core has included the steps of: providing in a mold cavity a charge of a pressurized gas-expandable molding material containing a blowing agent; maintaining injection pressure against the charge to preclude the blowing agent from expanding prior to the formation of the high density shell; cooling the mold to form a hardened shell of molding material adjacent the mold surface; reducing the pressure on the charge to allow the expansion of the blowing agent in the unhardened portion of the charge so as to cause the production of a foam structure within the shell and expulsion of excess material from the mold cavity; and, cooling the formed article to finally set the foamed molding material.

Two difficulties have been encountered in attempting to practice the above-described method. First, the unfoamed charge of molding material has exhibited the tendency to foam and set during injection or otherwise prematurely, resulting in either an incomplete product or in a product not having the desired hardened shell around a foam center. Secondly, the process has resulted in excessive planned wastage of molding material which, although subject to recovery and ultimate use, requires further treatment, thus increasing the cost of the manufacturing operation.

Considering first the problem of premature setting and foaming, some known injection molding methods and apparatus ordinarily inject compressed molding material containing a blowing agent into a mold wherein provision is made for rapid cooling of the outer portion of the injected material prior to expansion so as to achieve the desired hardened shell around a foam center. The mold cavity, initially being at a pressure substantially below the vapor pressure of the blowing agent in the molding material being injected, provides a reduced-pressure environment into which the molding material being injected may foam because of the reduction in pressure on the blowing agent to a point below that required to prevent foaming. Thus, immediately upon entering the mold cavity, the mass of molding material starts expanding and, since the mold is ordinarily at a substantially lower temperature than the molding material, shortly after the commencement of expansion, the expanded material starts to set. Thus, the unfavorable combination of pressure and temperature conditions in the mold cavity tend to cause premature setting of the molding material which often occurs in the area near the injection nozzle causing clogging, variations from desired product consistency, and wastage.

Additionally, most known methods and apparatus for the injection molding of foaming molding materials have a relatively high degree of planned wastage inherent in their practice and use because of the amounts of material left in runner and sprue passages. Attempts to reduce this wastage have been made, including that of allowing excess material to flow back through the system during expansion to become part of the next batch of material to be injected. The attempts have been met with difficulty, however, particularly with the problem of the excess material setting during return flow, thus causing clogging of the injection nozzle.

Accordingly, it is the object of the present invention to provide a method of and apparatus for injection molding of foamable thermoplastic material wherein premature setting is precluded and wastage of material is minimized.

SUMMARY OF THE INVENTION

A method of injection molding according to the teaching of the present invention may include the steps of introducing a gas into a mold cavity at a pressure sufficient to prevent foaming of a foamable molding material and injecting the foamable material into the cavity having pressurized gas therein. Additional aspects of the present invention may include; controllably exhausting gas from the mold cavity during injection; controlling the temperature of the mold before, during, and after the injection of molding material; and forcing excess foamable material away from the mold cavity after, and selectively also before allowing the material to foam so as to recompress the excess molding material for use as part of a charge for the next subsequent molding cycle.

An apparatus in accordance with the teaching of the present invention may include a mold having a cavity therein, means for injecting foamable molding material into the mold cavity, and means for introducing a pressurized gaseous substance into the mold cavity prior to injecting so as to prevent foaming of the molding material during injection.

BRIEF DESCRIPTION OF THE DRAWINGS

A more complete understanding of the exact nature of the present invention and many of its attendant advantages may be had from a consideration of the following detailed description, particularly when read in the light of the attached drawings wherein.

DETAILED DESCRIPTION

Figure 1:
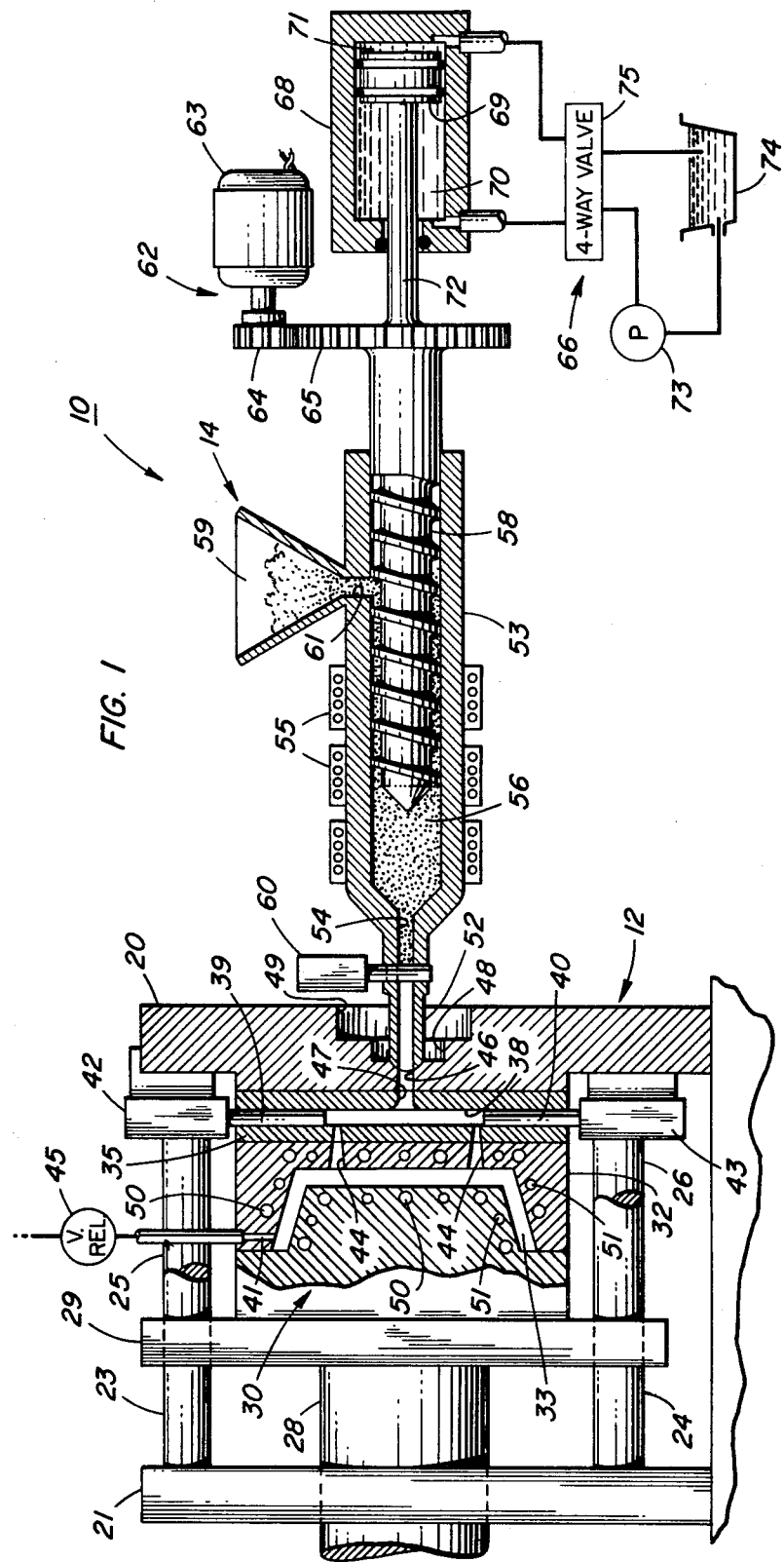
FIG. 1 is an elevational view, partly in section of an apparatus according to the present invention.

Referring now to FIG. 1, there is shown a novel injection molding apparatus, designated generally by the reference numeral 10, for practicing an injection molding method according to the teaching of the present invention.

Apparatus 10 comprises a molding section, designated generally by the reference numeral 12, and a melting and injection section designated generally by the reference numeral 14. Molding section 12 includes a frame having a front plate 20 and a back plate 21 connected by four rail members 23, 24, 25 and 26. A ram 28 passes freely through back plate 21 to reciprocably drive a mold plate 29 which is slidably mounted on rail members 23 through 26. Mold plate 29 serves as a mounting member for a retractable mold section 30 which cooperates with a stationary mold section 32 to define a mold cavity 33, as will be discussed hereinafter in greater detail.

Positioned between stationary mold section 32 and front plate 20 is a runner plate 35. Runner plate 35 is in surface-to-surface contact on one side with the base of stationary mold section 32, and is in surface-to-surface contact on its other side with front plate 20. Runner plate 35 is provided with a runner passage 38 extending vertically therethrough from top through bottom, which passage reciprocably receives runner pistons 39 and 40 through its upper and lower ends respectively. Pistons 39 and 40 are operated by fluid motors 42 and 43 respectively, as will be discussed in greater detail. A pair of longitudinally extending sprue passages 44 communicate runner passage 38 with mold cavity 33. Each of the sprue passages 44 is spaced outwardly of the center of passage 38, one each located at points substantially midway between the center of passage 38 and its upper and lower extremities.

A passage 41 is provided in stationary mold section 32 for communicating mold cavity 33 with a line source of pressurized nitrogen, as will be discussed further. A relief valve 45 is provided in the nitrogen source line to preclude build up of nitrogen pressure in cavity 33 beyond predetermined limits. These limits are in the range of being greater than the vapor pressure of the blowing agent being utilized, but less than the injection pressure of the molding material. Also formed in the retractable and stationary mold sections are a plurality of passages 51. Passages 51 define a flow path for mold cooling fluid, the fluid being provided from suitable sources (not shown).

Disposed in the mold sections 30, 32 between passages 51 are a plurality of heater elements 50 for selectively heating the mold sections. In the apparatus disclosed, resistance heating elements are shown, but it is to be recognized that heating can also be accomplished by other means such as the circulation of hot fluid through suitable passages, or by the use of radiant heaters.

Front plate 20 is provided with a central bore 46 which extends axially therethrough and communicates with a coaxial bore 47 in runner plate 35. A pair of coaxial counterbores 48 and 49 are provided in the outer surface 50 of front plate 20 to accommodate the insertion of an injection nozzle 52 of a charge barrel 53, as will be discussed in greater detail. Counterbore 48 is of relatively smaller diameter and spaced inwardly of counterbore 49.

Charge barrel 53 comprises a generally cylindrical barrel having a reduced diameter portion at one end defining the injection nozzle 52. Nozzle 52 has a passage 54 extending longitudinally axially therethrough, which passage cooperates with bores 46 and 47 to define an injection passage for communicating runner passage 38 with a melting and injection chamber 56 within charge barrel 53. Barrel 53 is provided with suitable electric heating bands 55 which serve to melt the charge of molding material. A quick opening valve 60 is provided in nozzle 52 to selectively interrupt and allow the flow of molten molding material through passage 54.

Chamber 56 of charge barrel 53 is generally cylindrical having its other end open to accommodate the insertion of a rotatable, reciprocable screw drive 58. As will be discussed further in greater detail, screw drive 58 charges barrel 53 with molding material which is introduced to chamber 56 from a suitable hopper 59 through a passage 61 in the barrel wall.

Screw drive 58 is provided with two distinct sources of motive power. The first, a rotational drive designated generally by the reference numeral 62, comprises a motor 63 driving a pinion 64 which is in meshing engagement with a gear 65 formed on the shaft of screw drive 58. Actuation of motor 62 by suitable control apparatus (not shown) causes the rotation of screw drive 58 in either the clockwise or counterclockwise direction as desired.

The second source of motive power for screw drive 58 is a reciprocating drive designated generally by the reference numeral 66. Reciprocating drive 66 comprises generally a fluid cylinder 68 having a piston 69 mounted for reciprocation and rotation therein, which piston separates the interior of cylinder 68 into two chambers 70 and 71. Piston 69 is rigidly secured on one side to a rod 72 which is also connected to screw drive 58 adjacent gear 64. The opposed ends of cylinder 68 are in communication with a hydraulic control system including a pump 73, reservoir 74 and control valve 75 so that pressurized fluid may be selectively introduced or withdrawn from chambers 70 and 71 to suitably reciprocate piston 69. In that screw drive 58 is rigidly secured to piston 69 by rod 72, it is evident that as piston 69 is displaced back and forth within cylinder 68, screw drive 58 is carried therewith and caused to act as a piston within chamber 56.

In operating the above-described apparatus according to the teaching of the present invention, ram 28 is advanced to the position shown in FIG. 1, thus positioning retractable mold 30 adjacent stationary mold 32 to define mold cavity 33. It is to be recognized that with the molds 30, 32 in the position shown in FIG. 1, their engagement is such as to render mold cavity 33 fluid tight.

Heater elements 50 are then actuated in both the retractable and stationary mold sections to preheat the molds to a temperature which obviates the possibility of premature hardening of the molding material upon injection. It has been found that preheating the molds to a temperature in the range of 200° to 400° F is preferrable for most applications, however other temperatures may be found to be more appropriate depending upon the material being molded. Generally the higher mold temperatures are helpful in obtaining a good surface finish. Concurrently with the heating of mold sections 30, 32, a charge of a gaseous substance such as pressurized nitrogen in introduced to mold cavity 33 through passage 41. The pressure of the nitrogen should be higher by some degree than that pressure below which the molding material will commence foaming so as to preclude foaming of the molding material during injection, but lower than the pressure of injection so as not to interfere with the injection process. It is to be noted, also, that while the present invention is being described in terms of nitrogen being used as a preferable pressurizing gas for mold cavity 33, other substantially inert gases may be used with satisfactory results.

With injection valve 60 closed, i.e., the passage 54 in nozzle 52 is closed to flow, a charge of molding material to be melted is advanced within chamber 56 of barrel 53 by actuating motor 63 to cause clockwise rotation of screw drive 58, thus forcing molding material into chamber 56 from hopper 59 and toward the nozzle 52 of barrel 53. In this regard, it is to be recognized that the method and apparatus according to the teaching of the present invention may be used for the injection molding of virtually any molding material, e.g., foamable thermoplastic resins. Thus, the present method has been practiced using available polyethylenes, such as commercially high density polyethylene copolymer (containing about 1 percent of butene-1), dry blended with 2 percent by weight of azodicarbonamide ($NH_2 \cdot CO \cdot CO \cdot NH_2$) as a blowing agent. Ordinarily the charge composition comprises a predominant proportion of resin together with a smaller proportion of the blowing or foaming agent, generally about 1–10 weight percent of the resin. Among the other suitable resins are nylon, polystyrene, polypropylene, and among the other blowing agents are the low boiling alcohols such as methanol and propanol; the low boiling ethers such as dimethyl ether and chloroflouroalkanes such as 1, 2-dichlorotetrafluoroethane. These materials are known to those skilled in the art and as such further discussion is not deemed necessary. Further, as will be recognized by those skilled in the art, certain aspects of the present invention have utility in the injection molding of nonfoaming as well as foaming molding materials.

The advance of molding material within barrel 53 by rotation of screw drive 58 causes the screw drive 58 to be displaced rightwardly (as seen in FIG. 1) as chamber 56 is filled. Thereafter, when the molding material is thoroughly melted and mixed with the blowing agent, hydraulic control system 66 is actuated to withdraw the fluid from cylinder chamber 70 and inject fluid into cylinder chamber 71 thereby tending to displace piston 69 and therewith screw drive 58 to the left from the position shown in FIG. 1, to the position shown in FIG. 2. Displacement of screw drive 58 to the left causes an increase of pressure in the charge in chamber 56 in anticipation of the actual injection.

When the presence in chamber 56 is suitably high, valve 60 is opened and the pressurized molding material is injected through passages 54, 46, and 47 to runner passage 38 and thereafter through sprues 44 into mold cavity 33. The pressurized nitrogen in cavity 33 precludes premature foaming of the molding material but does not interfere with injection since as progresses, excess nitrogen is controlledly exhausted from the cavity through relief valve 45 which is preset at some pressure greater than the vapor pressure of the blowing agent and less than the injection pressure of the molding material. It is to be noted that during the injection of molding material, runner pistons 39 and 40 are maintained in the retracted position so as to not interfere with the flow of material through runner passages 38 and sprues 44.

Figure 2:
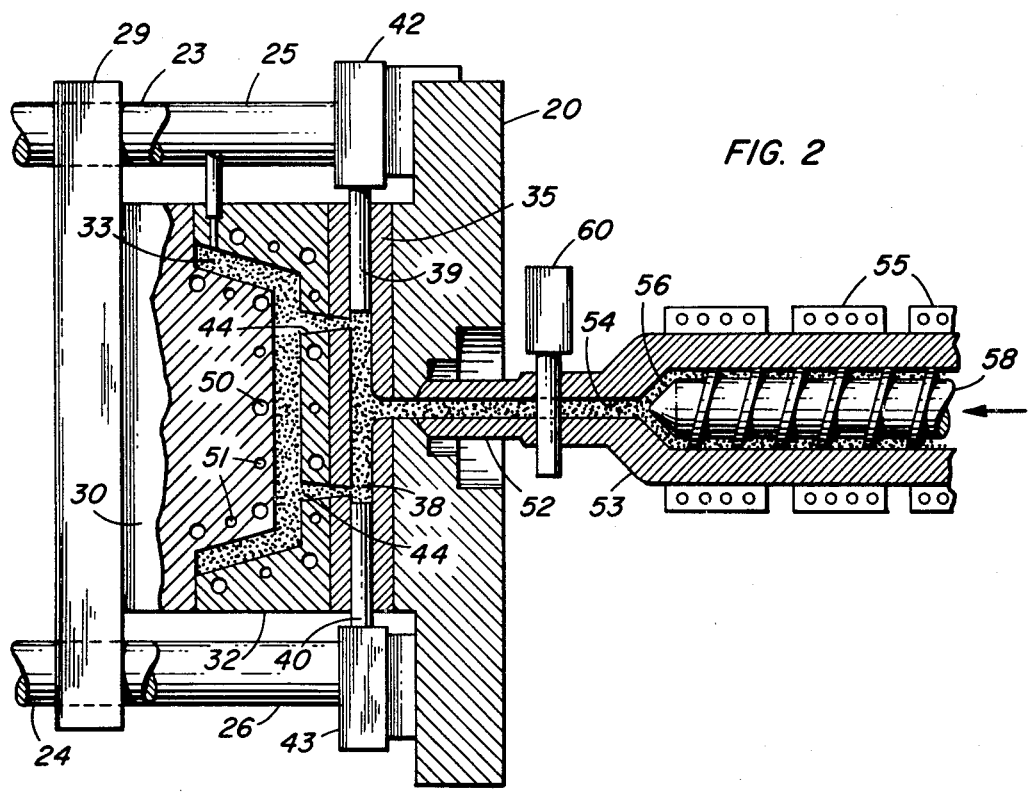
FIG. 2 is an elevational view, partly in section and similar to FIG. 1, but showing only a portion of the mold apparatus in a stage of the present method subsequent to the stage shown in FIG. 1.

Upon completion of the injection, the apparatus is oriented as shown in FIg. 2, mold cavity 33 is filled with molding material and pressure is maintained upon the molding material by the compressive force of screw drive 58 while a solid outer layer or skin of material is being formed within the mold. The pressure exerted by screw 58 is maintained to preclude foaming of the molding material prior to the complete formation of the hard outer layer of material. The thickness of the outer layer is controllable by suitably regulating the temperature of mold sections 30, 32 by an appropriate balance of hot and cold fluids flowing through passages 50 and 51 respectively, and by selectively controlling the amount of time during which injection pressure is maintained on the injected material.

Figure 3:
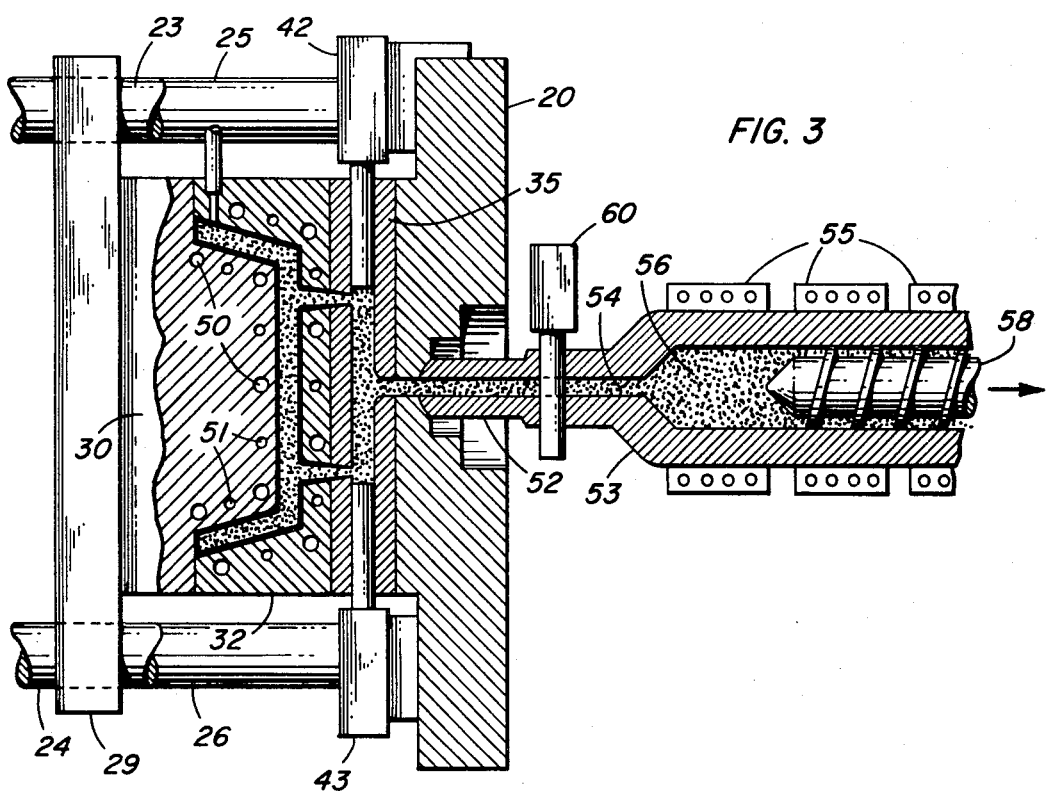
FIG. 3 is a view similar to that of FIG. 2, but showing a stage of the present method subsequent to the stage shown in FIG. 2.

Once a solid skin of plastic material has been formed as desired, screw drive 58 is retracted by reciprocating control system 66 (FIG. 3). Retraction of screw 58 relieves the pressure on the molding material, thus allowing the unfoamed material contained within the hardened shell to expand and generate a foamed central portion. As the unfoamed, unhardened material expands, an excess is generated which flows back out of sprues 44, into runner passage 38 and ultimately back into charge barrel 53.

Once sufficient expansion has been permitted, fluid motors 43 and 42 are actuated to advance pistons 39 and 40 into runner passage 38 (FIG. 4) so as to cover sprues 44, recompress the excess material contained therein and force the excess molding material back through the injection passage, i.e., runner passage 38, and passages 46, 47 and 54, toward charging barrel 53. The temperature in mold sections 30 and 32 is then lowered by reducing the heating rate of heaters 50 while maintaining a flow of cold fluid in passages 51. With the mold temperature thus lowered, the molded article hardens, after which ram 28 is actuated to retract mold section 30 so as to permit removal of the product 80, see FIG. 4. When the product is removed, pistons 39 and 40 are retracted, mold section 30 is advanced to molding position and the entire cycle is repeated.

The apparatus of the present invention may be operated to practice an alternative method according to the teachings of the present invention.

Considering this alternative method, and referring again to FIG. 1, start-up of the cycle is commenced by filling chamber 56 of charge barrel 53 with foamable molding material and pressurizing the foamable molding material in the same manner as discussed above. Also, ram 28 is advanced to position retractable mold 30 adjacent stationary mold 32 to define fluid tight mold cavity 33.

Mold sections 30, 32 are then preheated by heater elements 50, and a charge of pressurized gaseous substance, such as pressurized nitrogen, is introduced to the mold cavity 33 through passage 41. As discussed above, the pressure of the gas should be higher by some degree than that pressure below which the molding material will commence foaming so as to preclude foaming of the molding material during injection. Additionally, during start-up, pistons 39 and 40 should be maintained retracted so that the pressurized gas fills not only mold cavity 33 and sprues 44 but also runner passage 38, central bore 46 of front plate 20, and injection nozzle 52 back to quick opening valve 60. In subsequent cycles, however, as will be discussed below, the pistons 39 and 40 are maintained advanced prior to injection and thus, the pressurized gas fills only mold cavity 33 and sprues 44.

With the barrel chamber 56 and mold cavity 33 charged with molding material and pressurized gas respectively, valve 60 is opened and the pressurized molding material is injected through passages 54, 46 and 47, into runner passage 38, and thereafter through sprues 44 into mold cavity 33. During this injection, and in the same manner discussed above, the pressurized gas is relieved from mold cavity 33 through relief valve 45 in such a manner as to maintain the molding material under pressure which is sufficiently great to preclude premature foaming and sufficiently small to not interfere with injection.

Figure 4:
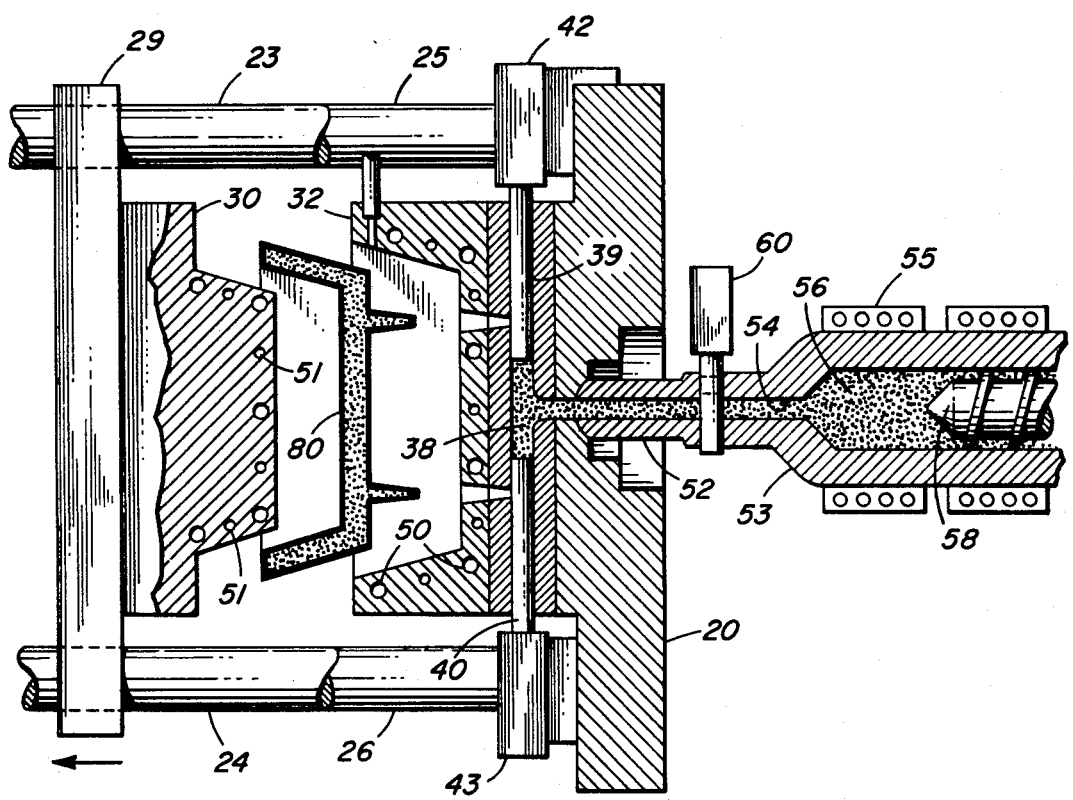
FIG. 4 is a view similar to that of FIGS. 2 and 3, but showing a stage of the present method subsequent to the stage shown in FIG. 3.

Upon completion of the injection of molding material into mold cavity 33 (FIG. 2), the temperature of the mold sections 30, 32 is suitably regulated to cause the formation of a hard outer layer of material adjacent the surface of the mold sections. Concurrently with the formation of the hard outer layer of material, runner pistons 39 and 40 are advanced in runner passage 38 to force the pressurized unused molding material back toward charge barrel 53 (i.e., runner pistons 39 and 40 advance from their position as shown in FIG. 3 to their position as shown in FIG. 4). The advance of pistons 39 and 40 to cause the flow back of unused molding material generates a pressure against screw drive 58 which is sufficient to displace screw drive 58 away from nozzle 52 at a rate which permits the receipt of the unused material to passage 54.

When pistons 39 and 40 are fully advanced, valve 60 is closed. Thereafter, when the outer layer of material is formed to the desired thickness, pistons 39 and 40 are retracted within runner passage 38. The retraction of pistons 39 and 40 uncovers sprues 44 and also creates a void in passage 38 into which excess molding material may flow during foaming. Specifically, by uncovering sprues 44, the pressure on the molding material in mold cavity 33 is relieved and foaming thus commences. As foaming progresses, an excess volume of material is generated which flows out of sprues 44 and into the void in runner passage 38 generated by the reaction of pistons 39 and 40.

If the volume of the void in runner passage 38 is sufficient to accommodate all the excess foamed material generated in the manufacture of a particular article, then upon the filling of the void in runner passage 38, pistons 39 and 40 are advanced to once again cover sprues 44, valve 60 is opened, and the foamed material is recompressed and forced back toward chamber 56 of charging barrel 53. It is to be recognized, however, that the volume of excess foamed material generated in the manufacture of a particular article may be greater than the volume of the void of runner passage 38. In this situation, the void may be filled in the manner discussed above, pistons 39 and 40 may thereafter be advanced to recompress the foamed molding material and force the foamed molding material back into chamber 56 and thereafter, valve 60 may again be closed and pistons 39 and 40 once again retracted to reestablish a void for receiving additional excess material. This process may be repeated as often as may be necessary to provide for the removal of all the excess material generated without suffering the wastage of any of this material.

Once sufficient expansion has been permitted and the excess material carried away for use in the next subsequent cycle, pistons 39 and 40 are maintained in their advanced positions (FIG. 4) so as to maintain sprues 44 covered, and the temperature in mold sections 30 and 32 is suitably controlled by the cooperation of heaters 50 and cooling fluid in positions 51 to cause hardening of the molded article. Thereafter, mold section 30 is retracted and the product 80 is removed (FIG. 4).

After the product 80 is removed, retractable mold 30 is repositioned adjacent stationary mold 32 to once again define mold cavity 33. A pressurized gaseous substance is introduced into mold cavity 33 to fill mold cavity 33 and sprues 44. Thereafter, with a fresh charge of foamable molding material, which charge includes that material which was recovered as excess and unused material from the prior cycle, screw drive 58 is advanced and pistons 39 and 40 are retracted within runner passage 38 so as to uncover sprues 44 and to allow injection of the new charge of molding material into mold cavity 33 as discussed above. Thereafter, the full molding cycle may be repeated so often as is desired to form as many articles 80 as are necessary.

It can be seen, therefore, that the above-described alternative method of utilizing the apparatus of FIGS. 1–4 provides for the discharge of excess foamable material into a void created by the reciprocation of pistons 39 and 40. Whereas, the first method described above provides for the discharge of excess foamed material into a space created by the retraction of screw drive 58 within chamber 56.

It is to be recognized that although the abovedescribed methods each include the steps of providing a pressurized gaseous substance within mold cavity 33 prior to the injection of molding material, there are articles which may be formed using aspects of the methods and apparatus of the present invention, which articles are configured in such a manner, or which articles are sufficiently small, to render the effect of the problem of premature foaming and setting negligible. In these situations, the present invention may be practiced without providing the pressurized gaseous substance in the mold cavity while still obtaining the advantages available through the positive recovery of the unused and excess material.

It should be understood, of course, that many modifications and variations of the present invention are possible in the light of the above teachings without departing from the spirit and scope of the invention. Accordingly, the present invention contemplates these modifications and variations as falling clearly within the scope of the present inventive concept.

What is claimed is:

1. An apparatus for the injection molding of a molding material comprising:
   a mold having a mold cavity therein;
   a chamber for the preparation of molding material prior to injection;
   a passage between said cavity and said chamber for accommodating the passage of molding material therethrough;
   means for injecting molding material from said chamber into said mold cavity; and
   means for forcing excess molding away from said molding cavity toward said chamber after said molding cavity has been filled whereby to compress and comingle said excess molding material with material to be used with a next subsequent molding cycle.

2. An apparatus as claimed in claim 1 and further including:
   means for introducing a pressurized gaseous substance into said mold cavity prior to the injection of said foamable molding material so as to prevent foaming of said molding material during injection.

3. An apparatus as claimed in claim 2 and further including:
   means for exhausting said pressurized gaseous substance from said mold cavity during injection of said molding material so as to maintain the pressure of said gaseous substance in said mold cavity at a level in excess of the pressure at which said foamable molding material will foam, and less than the pressure at which said molding material is injected.

4. The apparatus as claimed in claim 3 wherein: said means for exhausting is a presettable pressure relief valve.

5. An apparatus as claimed in claim 1 and further including:
   heating and cooling means for controlling the temperature of said mold before, during and after the injection of molding material into said mold cavity.

6. An apparatus for injection molding as claimed in claim 5, wherein said means for controlling the temperature of said mold comprises;
   heating means mounted in said mold, and
   a set of passages formed in said mold, said set of passages for accommodating the circulation of a relatively cold fluid therethrough.

7. An apparatus as claimed in claim 6 wherein:
   said mold comprises a retractable mold section and a stationary mold section; and
   each of said retractable mold section and said stationary mold section have heating means and fluid circulating passages disposed therein.

8. The apparatus as claimed in claim 1 wherein:
   said passages comprise an injection passage, a runner passage and a sprue passage; and
   said means for forcing is mounted in said runner passage 9. The apparatus as claimed in claim 8 wherein:
   said means for forcing comprising at least one piston reciprocably mounted in said runner passage.

10. An apparatus for the injection molding of a foamable molding material comprising:
    a mold having a retractable mold section and a stationary mold section, said retractable mold section being positionable in juxtaposition to said stationary mold section to define a mold cavity therebetween;
    a charging barrel defining a melting and injection chamber for preparing a charge of foamable molding material before injection;
    drive means mounted within said charging barrel for introducing foamable molding material into said chamber, for pressurizing said foamable molding material within said chamber, and for injecting said molding material into said mold cavity;
    passage means for communicating said mold cavity and said chamber;
    heating and cooling means disposed in said retractable an said stationary mold sections for controlling the temperature of said mold before, during and after the injection of said foamable molding material;
    means mounted in said passage means for forcing unused molding material away from said mold cavity and toward said chamber whereby the pressure in said unused molding material is increased and said unused molding material is compressed and comingled with molding material to be used in a next subsequent molding cycle;
    means for introducing a pressurized gaseous substance into said mold cavity before injection of said molding material; and
    means for exhausting said pressurized gaseous substance from said mold cavity during injection of said molding material whereby the pressure of said gaseous substance is maintained in excess of the pressure at which said foamable molding material foams and less than the pressure at which said molding material is injected.

* * * * *

PO-1050
(5/69)

UNITED STATES PATENT OFFICE
CERTIFICATE OF CORRECTION

Patent No. 3,719,441       Dated March 6, 1973

Inventor(s) Albert Spaak and Clifford L. Weir

It is certified that error appears in the above-identified patent and that said Letters Patent are hereby corrected as shown below:

Column 9, line 18, after "cavity" insert -- for foaming --.
      Column 9, line 19, after "molding" insert -- material generated during foaming --.

Signed and sealed this 2nd day of April 1974.

(SEAL)
Attest:

EDWARD M. FLETCHER, JR.
Attesting Officer

C. MARSHALL DANN
Commissioner of Patents